June 20, 1933. W. C. FURNAS 1,914,688
REVERSING DRIVE
Filed July 28, 1928 2 Sheets-Sheet 1

Inventor
W. C. Furnas
by
Attorney

June 20, 1933.   W. C. FURNAS   1,914,688
REVERSING DRIVE
Filed July 28, 1928   2 Sheets-Sheet 2

Inventor
W. C. Furnas
by
Attorney

Patented June 20, 1933

1,914,688

UNITED STATES PATENT OFFICE

WILLIAM C. FURNAS, OF WEST ALLIS, WISCONSIN, ASSIGNOR TO ALLIS-CHALMERS MANUFACTURING COMPANY, OF MILWAUKEE, WISCONSIN, A CORPORATION OF DELAWARE

REVERSING DRIVE

Application filed July 28, 1928. Serial No. 295,930.

This invention relates to mechanical drives, and is specially applicable to reversing drives. It is particularly useful in driving machine tools such as planers and the like.

It is an object of the invention to provide a drive in which shock to the parts is minimized in starting the driven parts, including, for example, the table of a planer, and also in reversing the motion of the driven parts.

It is another object to provide a drive in which a plurality of speeds of driven parts may be obtained with a fixed speed of the driving part; and also in which still another speed may be obtained with the driven parts operating in the reverse direction.

Still another object is the provision of a drive adapted for use where only alternating current is available for supplying the driving motors and control devices.

A still further object is the provision of a mechanical drive which is compact and efficient. Other objects will appear hereinafter as the description of the invention proceeds.

The novel features of the invention will appear from this specification and the accompanying drawings forming a part thereof and disclosing one embodiment of the invention, and all these novel features are intended to be pointed out in the claims.

Figure 1:
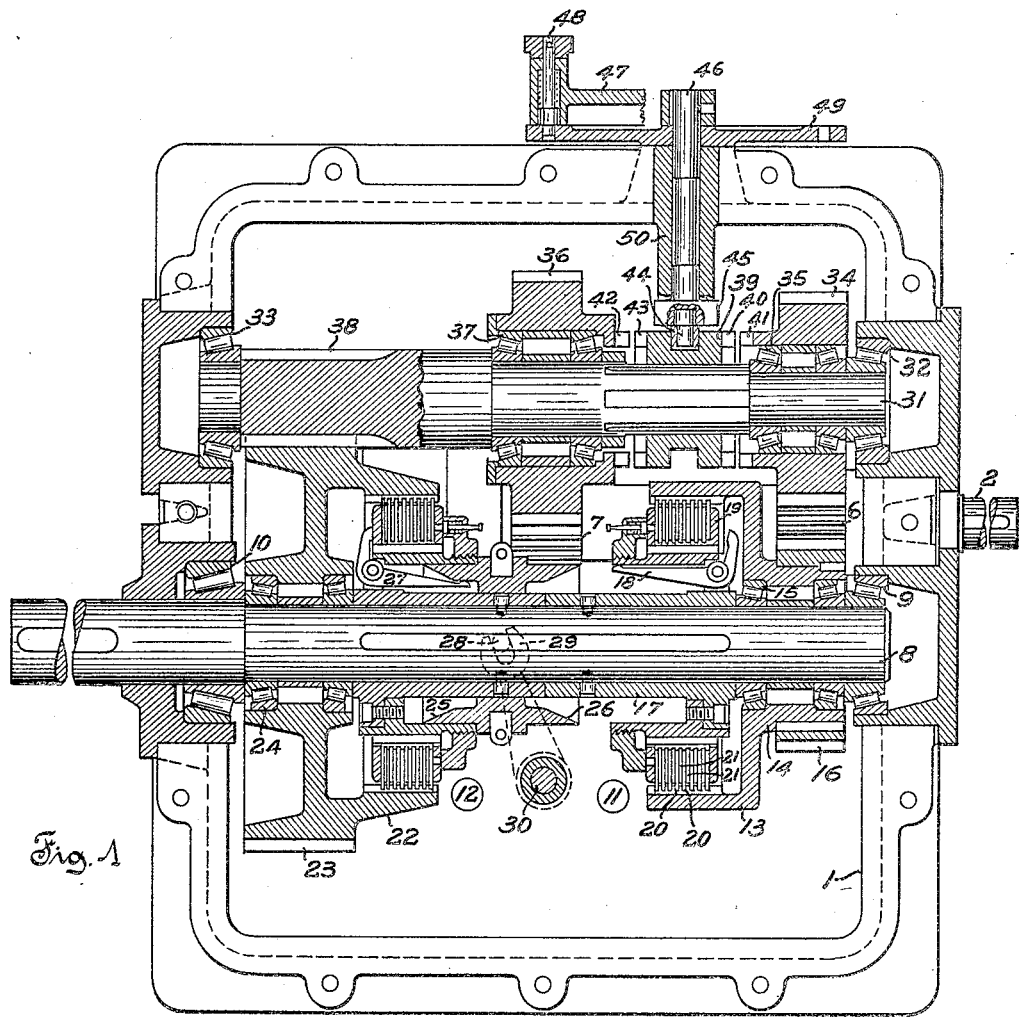
Fig. 1 is a plan view, partly in section, of a drive embodying the invention, the upper part of the casing of the drive and parts associated with said upper part having been removed.
Figure 2:
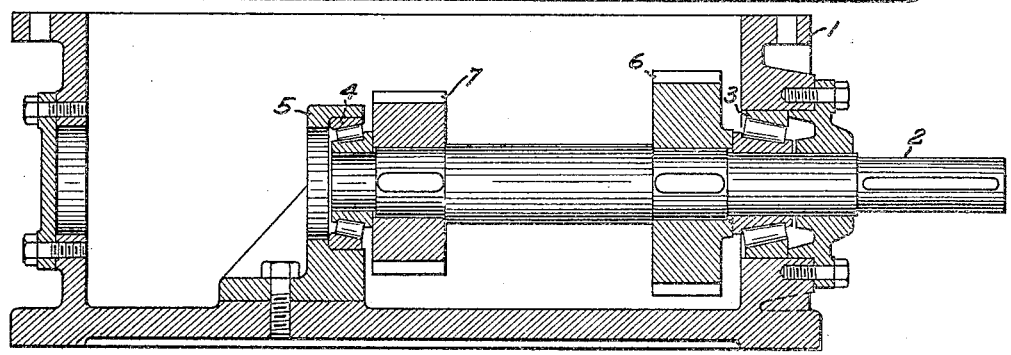
Fig. 2 is a sectional elevation of a portion of the parts shown in Fig. 1, the section being taken along the axis of the shaft 2.

Referring particularly to Fig. 1 the drive may be provided with a casing 1 and a driving shaft 2 having a suitable bearing 3 in the casing. The parts associated immediately with shaft 2 being substantially covered by other parts in Fig. 1, they are shown in elevation in Fig. 2. The other end of shaft 2 is here shown as provided with a bearing 4 mounted in a pedestal 5 suitably supported and held on the bottom of the casing 1. The shaft 2 is here shown as provided with gears 6 and 7 keyed to the shaft.

The drive is provided with a driven shaft 8 having suitable bearings 9, 10 in the casing 1. The shaft 8 has clutches 11 and 12 associated therewith. The clutch 11 includes a drum 13 having a hub 14 adapted to revolve about a bearing 15 associated with the shaft 8. Keyed to the hub 14 is a gear 16 which is adapted to mesh with the gear 6 on the shaft 2. A sleeve 17 surrounding the shaft 8 and keyed thereto is adapted to carry the driven elements of the clutch 11. Suitably pivoted to a portion of the sleeve member 17 is a means for causing engagement between the clutch elements, here shown as a bell crank lever 18 adapted to engage a movable plate 19. The plate 19 is adapted to force the clutch disks 20, carried by the drum 13 into engagement with the clutch disks 21 associated with the sleeve 17. The disks carried by the drum and sleeve alternate with each other.

The clutch 12 includes a drum 22 here shown as formed by a lateral extension on a gear 23 the hub of which has associated therewith a bearing 24 in turn associated with the shaft 8. The drum 22 carries a plurality of clutch disks adapted to cooperate with a plurality of disks carried by a sleeve similar to the sleeve 17 as described in connection with clutch 11. The element of clutch 12 associated with shaft 8 also carries means for causing engagement between the clutch disks including a bell crank lever 27.

Figure 3:
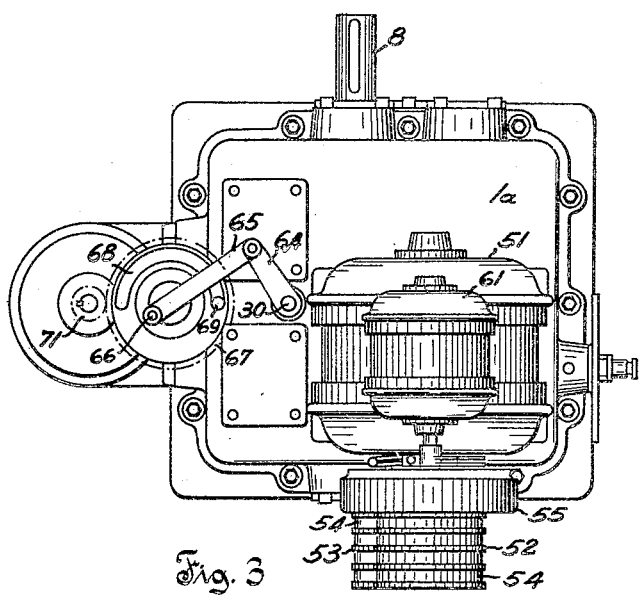
Fig. 3 is a plan view of the drive in fully assembled condition.

Means is provided for causing engagement between the clutch disks of the clutches 11 and 12 respectively here shown as a cam member having cam surfaces 25, 26. The cam member is slidable on the sleeve member 17 and is shown in the drawings as having caused the bell crank 27 to swing in a clockwise direction to cause engagement between the clutch disks of clutch 12. If the cam member is slid toward the right the bell crank 27 is released thereby disengaging the elements of clutch 12 and the cam 26 causes the bell crank 18 to cause engagement between the clutch elements of clutch 11. The cam member is provided with a pin 28 with which a forked lever 29 is associated. The lever 29 is keyed to a shaft 30 and by swinging this shaft either clutch drum 13 or drum 22 may be put in driving relation with respect to shaft 8. The shaft 30 may be suitably journaled in a cover 1a for the casing, as shown in Fig. 3.

The drive includes an intermediate shaft 31 having suitable bearings 32, 33 mounted in the casing 1. The shaft 31 is here shown as having two gears associated therewith. A gear 34 is rotatable about a bearing 35 associated with the shaft 31 and this gear is adapted to mesh with the gear 6 on shaft 2. Another gear 36 is adapted to rotate about a bearing 37 associated with shaft 31 and this gear is adapted to mesh with the gear 7 on shaft 2. Means is provided whereby either of the gears 34, 36 may be put in driving relation with shaft 31. This means is here shown as a coupling 39, feathered on the shaft 31, this coupling and the gear 34 being provided with complementary projections and recesses 40, 41. The coupling 39 and the gear 36 are also provided with complementary projections and recesses 42, 43. The coupling 39 is shown in Fig. 1 as out of engagement with both gears 34 and 36. It may be slid into engagement with either of these gears by means including a pin 44, operating in a suitable recess in the coupling, carried by a crank 45 associated with a shaft 46. The shaft 46 is suitably journaled in a bearing 50 in the casing 1. On the exterior of the casing the shaft 46 may be swung by means of a crank 47. This crank would, in the position of the crank 45, be in a position vertical to the plane of the paper but in order to show it more clearly it has been broken away from the shaft 46 to show it in the plane of the paper. The crank 47 is provided with a pin 48 which may enter holes in a disk 49 indicating and determining the position of the coupling 39.

The shaft 31 is also provided with a pinion 38 adapted to mesh with the gear 23. The pinion 38 may comprise teeth cut directly on shaft 31 as shown.

Figure 4:
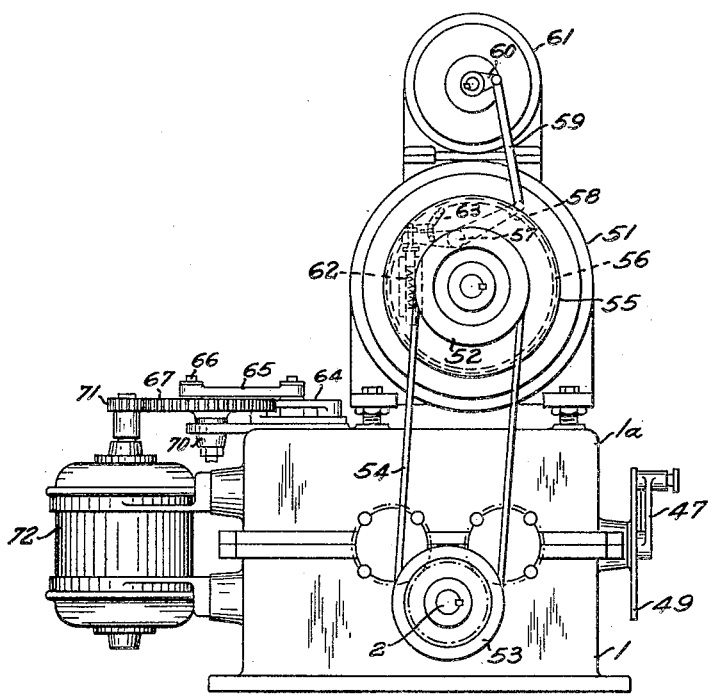
Fig. 4 is an elevation of the drive corresponding to Fig. 3.

The driving shaft 2 may be driven by means of a motor 51 mounted on the cover 1a, the motor being provided with a suitable pulley 52 connected by a belt or belts 54 with a pulley 53 on the shaft 2. The motor 51 may be provided with a brake including a brake drum 55 and a brake band or shoe 56. The brake shoe 56 may be caused to engage the drum by means including a rock shaft 57 carrying a bell crank lever 58 connected by means of a rod 59 to a crank 60. The crank 60 is adapted to be swung so as to cause disengagement of the brake elements by means of a torque motor 61. A spring 62 suitably associated with lever 58 is adapted to release the brake parts. The lever 58 is operatively associated with a toggle 63 which when the lever 58 is swung in a clockwise direction as viewed in Fig. 4 is adapted to cause engagement between the brake shoe and the brake drum. The arrangement is such that when current is supplied to the motor 51 current is also supplied to the torque motor 61 thereby causing release of the brake. When current is cut off from these motors the brake is applied.

Referring to Figs. 3 and 4, the shaft 30 is adapted to be swung by means of a crank 64 associated therewith and connected by means of a rod 65 to a pin 66 associated with a gear 67. The gear 67 is here shown as provided with a slot 68 in which a stop or buffer 69 associated with the cover 1a is disposed. The stop 69, as is obvious, limits the arc of movement of the gear 67. The gear 67 is rotatable about a suitable bearing 70 carried by the cover 1a, and is shown as meshing with a pinion 71 carried by the shaft of a torque motor 72. The use of electric torque motors is of particular advantage in connection with use of the drive where only alternating current is available for supplying the various motors inasmuch as solenoids sufficiently large become unwieldy and expensive, but obviously any other well known kind of motor may be used. It is moreover difficult to obtain a comparatively long motion with solenoids, and the control of the application of force by the solenoid core is also more difficult.

The torque motor 72 may be operated from any suitable circuit which may be controlled in any suitable manner as for example by a planer table or any portion of the machine which may be driven by the shaft 8.

The operation is as follows. Assuming that the crank 47 has been swung so that the coupling 39 is in engagement with the gear 34 and that the cam 25 has caused engagement of the clutch 12, rotation of the driving shaft 2 will, through gear 6, cause the rotation of both gears 16 and 34. The clutch 11, however, being not in engagement the gear 16, along with the clutch drum 13, rotates freely about the shaft 8. The gear 34, however, is at this time in driving relation to shaft 31 and this shaft is consequently rotated at a speed determined by the relative diameters of gears 6 and 34. The rotation of shaft 31 causes the pinion 38 to drive the gear 23, and through the clutch 12, the driven shaft 8 at a speed determined by the relative diameters of the pinion 38 and the gear 23. If the shaft 8 is connected say to a planer the table thereof will be driven in the cutting direction at a suitably slow speed. It will be noted incidentally that while the gears 7 and 36 are in mesh, the gear 36 rotates freely about the shaft 31.

If now it is desired to reverse the direction of rotation of shaft 8, as for example to reverse the direction of movement of a planer table, the torque motor 72 is caused to reverse the direction of its torque so that the shaft 30 is swung in a clockwise direction as viewed in Fig. 1. This causes disengagement of the clutch members of the clutch 12 and as the cam 26 moves still further to the right the bell crank lever 18 begins to squeeze the disks of clutch 11 together. These clutch disks preferably run in a bath of oil and will of course have oil between their cooperating surfaces. Consequently before there is complete clutching engagement between the co-operating clutch disks the oil must be first squeezed out from between the cooperating disks. This action results in a comparatively smooth and gradual application of power for stopping and reversing the rotation of shaft 8 and the parts driven thereby. When the clutch elements of clutch 11 begin to exert their effect the shaft 8 is first brought to rest and then caused to rotate in the opposite direction inasmuch as the clutch drum 13 is driven by the gear 6 in a direction opposite from that in which the clutch drum 22 is driven by the pinion 38. The speed of shaft 8 in the reverse direction as hereinbefore set forth is preferably higher than in the first named direction so that for this direction of rotation it is suitable for driving a planer table, for example, on the return stroke.

If it be desired to alter the speed of rotation of shaft 8 on the first mentioned or forward direction, the drive will be stopped by stoppage of motor 51, and the crank 47 will be thrown so as to cause engagement between the coupling 39 and the gear 36. The shaft 31 will now, when the motor 51 is restarted, be driven in the same direction as hereinbefore described, but inasmuch as the ratio of gear 36 to gear 7 is greater than that of gear 34 to 6, the shaft 31 will be driven at a slower speed. Consequently when the clutch 12 is in engagement the shaft 8 will be rotated at a slower speed. However, when the clutch 11 is in engagement the shaft 8 will be driven in the reverse direction at the same speed as before.

It should be understood that it is not desired to limit the invention to the exact details of construction shown and described, for obvious modifications within the scope of the claims may occur to persons skilled in the art.

It is claimed and desired to secure by Letters Patent:

1. In combination, a driving shaft having two pinions thereon, an intermediate shaft having two gears rotatably mounted thereon and a pinion affixed to said intermediate shaft, a driven shaft having two gears rotatably mounted thereon, means for transmitting power from said driving shaft selectively by way of one or the other of said two gears on said intermediate shaft to said driven shaft to rotate said driven shaft in one direction at two different selectable speed ratios, and means for transmitting power from said driving shaft to said driven shaft independent of said intermediate shaft to rotate said driven shaft in the opposite direction.

2. In combination, a driving shaft, a driven shaft, a pair of gears rotatable with respect to said driven shaft, means including a pair of friction clutches for respectively connecting either of said gears with said driven shaft, means for transmitting power from said driving shaft to one of said gears at several different selectable speed ratios to rotate said gear in one direction, and means including a gear on said driving shaft meshing with the other of said gears and having a speed ratio different from any of the aforesaid speed ratios to rotate said driven shaft in the opposite direction.

3. In combination, a driving shaft, a driven shaft, an intermediate shaft, at least two gears rotatable about said intermediate shaft, means for coupling any selected one of said gears to said intermediate shaft, means whereby said driving shaft drives said gears at different speed ratios, a second pair of gears, rotatable about said driven shaft, means whereby said intermediate shaft drives one of said second pair of gears, means whereby said driving shaft drives the other gear of said second pair in a direction opposite from that of said first named gear of said second pair, and means including a pair of friction clutches whereby either of the gears of said second pair may be put in driving relation to said driven shaft.

4. In combination, a driving shaft, a driven shaft, an intermediate shaft, means for transmitting power at several different selectable speed ratios from said driving shaft to said intermediate shaft and from said intermediate shaft to said driven shaft to rotate said driven shaft in one direction, and means including a gear rotatable about and connectible to said driven shaft meshing with a gear on said driving shaft whereby said driven shaft may be rotated in the opposite direction.

5. In combination, a driving shaft, a driven shaft, an intermediate shaft, at least two gears rotatable about said intermediate shaft, means whereby a selected one of said gears may be put in driving relation to said intermediate shaft, gears on said driving shaft in operative relation respectively with the gears on said intermediate shaft, a gear rotatable about said driven shaft in operative relation with one of the gears on said driving shaft, another gear rotatable about said driven shaft, a gear on said intermediate shaft in operative relation to said last named gear, and means whereby either of the gears rotatable about said driven shaft may be put in driving relation to said shaft.

6. In combination, a driving shaft, two pinions affixed thereon, an intermediate shaft, two gears loosely mounted on said intermediate shaft and in continual engagement with said pinions respectively, coupling means for selectively connecting said gears to said intermediate shaft, a pinion affixed to said intermediate shaft, a pair of gears loosely mounted on said driven shaft and in continual engagement respectively with the pinion on said intermediate shaft and one of the pinions on said drive shaft, and a pair of friction clutches for selectively connecting said pair of gears to said driven shaft.

7. In combination, a driving shaft having a plurality of pinions affixed thereon, a driven shaft, a plurality of gears rotatably mounted on said driven shaft, an intermediate shaft, a plurality of gears loosely carried by said intermediate shaft, means for transmitting power from said driving shaft selectively through said pinions and said gears and through said intermediate shaft to said driven shaft at a plurality of different selectable speed ratios to rotate said driven shaft in one direction, and means for transmitting power from said driving shaft directly to said driven shaft to rotate said driven shaft in the opposite direction at a single speed ratio.

8. In combination, a driving shaft, two pinions affixed thereon, an intermediate shaft, two gears loosely mounted on said intermediate shaft and in continual engagement with said pinions respectively, coupling means for selectively connecting said gears to said intermediate shaft, a pinion affixed to said intermediate shaft, a pair of gears loosely mounted on said driven shaft and in continual engagement respectively with the pinion on said intermediate shaft and one of the pinions on said drive shaft, a pair of friction clutches for selectively connecting said pair of gears to said driven shaft, and means for operating the said coupling means and said clutches whereby said driven shaft is rotated in one direction at either of two speed ratios or in the other direction at a speed ratio lower than said other speed ratios.

9. In combination, a drive shaft having a pair of pinions affixed thereon, an intermediate shaft having a pair of gears rotatable thereon in constant mesh with said pinions, a driven shaft, means including a member manually operable to a plurality of positions for selectively transmitting power from said drive shaft to said intermediate shaft at a plurality of different speed ratios, means including a power actuated friction clutch operable to two positions for selectively transmitting power from said drive shaft either through said intermediate shaft to rotate said driven shaft in one direction or independent of said intermediate shaft to said driven shaft to rotate said driven shaft in the opposite direction at a different speed ratio.

In testimony whereof, the signature of the inventor is affixed hereto.

WILLIAM C. FURNAS.